United States Patent Office 2,929,850
Patented Mar. 22, 1960

2,929,850

PREPARATION OF INSECTICIDES

John P. Luvisi, Park Ridge, Ill., assignor, by mesne assignments, to Universal Oil Products Company, Des Plaines, Ill., a corporation of Delaware No Drawing. Application June 26, 1958
Serial No. 744,663

8 Claims. (Cl. 260—648)

This invention relates to a novel method for the preparation of polyhalo substituted cyclic compounds, and more particularly to a method of preparing polyhalo substituted cycloolefins. Still more particularly the invention is concerned with a novel method for preparing octahalo substituted cyclic hydrocarbons containing at least one olefinic double bond.

Compounds of the present invention which are prepared by the novel method hereinafter set forth contain polyhalo substituents on a cyclic nucleus and find a wide variety of uses in the chemical field. More particularly the compounds of the present invention may be employed as insecticides, said insecticides being effective against many insects, especially houseflies.

It is therefore an object of this invention to provide a novel method for the preparation of halo substituted cyclic compounds possessing insecticidal activity.

A further object of this invention is to provide a novel method for the preparation of polychloro substituted cyclic compounds containing at least one olefinic double bond and possessing insecticidal activity.

One embodiment of this invention may be found in a process which comprises reacting a polyhalocycloalkadiene with a polyhalo substituted acetaldehyde at a temperature in the range of from about 200° to about 260° C., and recovering the resultant polyhalo substituted cyclic reaction product.

A further embodiment of the invention is found in a process which comprises reacting a polychlorocycloalkadiene with a polychloro substituted acetaldehyde at a temperature in the range of from about 200° to about 260° C. and at a pressure in the range of from about 25 to about 100 atmospheres, and recovering the resultant polychloro substituted cyclic reaction product.

A specific embodiment of the invention resides in a process which comprises reacting hexachlorocyclopentadiene with trichloroacetaldehyde at a temperature in the range of from about 200° to about 260° C. and at a pressure in the range of from about 25 to about 100 atmospheres, and recovering the resultant polychloro substituted cyclic reaction product having the empirical formula $C_6Cl_8$.

Other objects and embodiments referring to alternative polyhalo substituted cycloalkadienes and polyhalo substituted acetaldehydes will be found in the following further detailed description of the invention.

As hereinbefore set forth it has now been discovered that polyhalo substituted cyclic compounds containing at least one olefinic double bond may be prepared by reacting a halo substituted cycloalkadiene with a halo substituted acetaldehyde at a temperature in the range of from about 200° to about 260° C. The obtention of this product is unexpected inasmuch as the expected product of such a reaction would be the Diels-Alder adduct, inasmuch as it is known that the reaction between chloral and cyclopentadiene will give the expected Diels-Alder condensation reaction product. Therefore, the expected product of the reaction between hexachlorocyclopentadiene and trichloroacetaldehyde would be 6-(trichloromethyl) - 5 - oxa - 1,2,3,4,7,7 - hexachlorobicyclo-[2.2.1]-2-heptene rather than the compound having the empirical formula $C_6Cl_8$ which was actually obtained.

The obtention of the product having the empirical formula $C_6Cl_8$ is illustrated by the following equations:

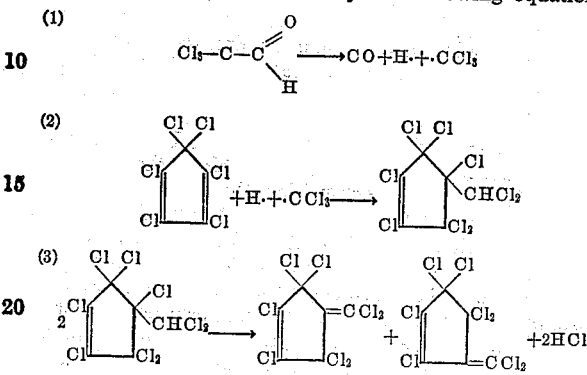

For purposes of this invention the term "halo substituted" will refer to both mono- and polyhalo substituted compounds. In the preferred method of this invention the halo substituted cycloalkadiene comprises a halo substituted cyclopentadiene which, when reacted with a halo substituted acetaldehyde, will produce a reaction product having the empirical formula $C_6X_nH_{8-n}$ in which X is a halogen selected from the group consisting of chlorine, bromine, fluorine, and iodine, the preferred halogens being those having an atomic weight of between 35 and 80 (i.e. chlorine and bromine) and $n$ is an integer of from 3 to 8.

Examples of halo substituted cycloalkadienes which may be used in this invention include the halo substituted 1,3-cyclopentadienes (hereinafter referred to as cyclopentadiene) such as 1-chlorocyclopentadiene, 2-chlorocyclopentadiene, 5-chlorocyclopentadiene, 1,2-dichlorocyclopentadiene, 1,3-dichlorocyclopentadiene, 1,4-dichlorocyclopentadiene, 5,5 - dichlorocyclopentadiene, 1,2,3-trichlorocyclopentadiene, 1,5,5-trichlorocyclopentadiene, 1,2,3,4-tetrachlorocyclopentadiene, 1,2,3,4,5-pentachlorocyclopentadiene, hexachlorocyclopentadiene, 1-bromocyclopentadiene, 2-bromocyclopentadiene, 5-bromocyclopentadiene, 1,2-dibromocyclopentadiene, 1,3-dibromocyclopentadiene, 1,4-dibromocyclopentadiene, 5,5-dibromocyclopentadiene, 1,2,3-tribromocyclopentadiene, 1,5,5-tribromocyclopentadiene, 1,2,3,4-tetrabromocyclopentadiene, 1,2,3,4,5-pentabromocyclopentadiene, hexabromocyclopentadiene, 1-fluorocyclopentadiene, 2-fluorocyclopentadiene, 5-fluorocyclopentadiene, 1,2-difluorocyclopentadiene, 1,3-difluorocyclopentadiene, 1,4-difluorocyclopentadiene, 5,5-difluorocyclopentadiene, 1,2,3-trifluorocyclopentadiene, 1,5,5-trifluorocyclopentadiene, 1,2,3,4-tetrafluorocyclopentadiene, 1,2,3,4,5-pentafluorocyclopentadiene, hexafluorocyclopentadiene, etc. Halo substituted acetaldehydes which may be reacted with the aforementioned halo substituted cycloalkadienes include trichloroacetaldehyde (chloral), tribromoacetaldehyde, trifluoroacetaldehyde, etc. In the preferred reaction of the present invention the halo substituents on both the cycloalkadiene and the acetaldehyde are identical although it is contemplated within the scope of this invention that cycloalkadienes and acetaldehydes containing dissimilar halo substituents may be reacted, although not necessarily with equivalent results.

The process of this invention is effected at elevated temperatures and pressures, the temperature being within the range of from about 200° to about 260° and at a superatmospheric pressure in the range of from about 25 to about 100 atmospheres or more, the amount of said pressure being that which is necessary to maintain at least a portion of the reactants in the liquid phase.

The process of this invention may be effected in any suitable manner and may comprise either a batch or a continuous type operation. For example, when a batch type operation is used, a mixture of the desired reactants are placed in an appropriate apparatus such as a rotating autoclave which is thereafter sealed and an inert gas such as nitrogen pressed in until the desired pressure has been reached. The autoclave is then heated to the desired reaction temperature and maintained thereat for a predetermined period of time. Upon completion of the desired reaction time the apparatus and contents thereof are cooled to room temperature, the excess pressure is vented and the desired reaction product is recovered by conventional means such as fractional distillation, crystallization, etc.

The process of this invention may also be effected in a continuous type operation. When this method is used the starting materials comprising the halo substituted cycloalkadiene and the halo substituted acetaldehyde are continuously charged to a reaction zone which is maintained at the proper operating conditions of temperature and pressure. The reactor may comprise an unpacked vessel or coil or may be lined with an adsorbent packing material such as fire brick, dehydrated bauxite, alumina and the like. Upon completion of the desired residence time the reaction product is continuously withdrawn, separated from the reactor effluent and recovered by conventional means hereinbefore set forth, while the effluent may be separated and recycled to form a portion of the feed stock. If so desired, the two reactants may be admixed prior to entry into said reactor and charged thereto in a single stream.

The physical properties of the polyhalo-substituted compounds having the empirical formula $C_6X_nH_{8-n}$ in which X is a halogen selected from the group consisting of fluorine, chlorine and iodine and $n$ is an integer of from 3 to 8, and the effects they have on entomological forms of life make them particularly desirable as insecticides and insect repellents, the compounds having many of the features desired of materials for this purpose. They are, for example, toxic to insects which are destructive of plant life and materials normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption, the plants when harvested and after allowing a reasonable time for evaporation of the applied insecticide therefrom, retain none of the toxicant to prevent the use of the plant for consumption as food. On the other hand, the compounds are of sufficiently limited volatility to be retained on the insect for the time required to accomplish the toxic effect of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or ether such as myricyl alcohol, dibutyl ether, etc.; or they may be emulsified with water by the addition of an emulsifying agent, such as a surface active agent, to the mixture of components. The latter solvents and dispersants may also be employed for the specific purpose of reducing the concentration of insecticide to the desired level in a specific insecticidal formulation. The particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes the required concentration of active components in the formulation may be as low as 0.1%, as for example, in the treatment of fabrics for destroying moth larvae.

In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article, for example, a low molecular weight, normally gaseous carrying agent. The active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The following examples are given to illustrate the process of the present invention, which, however, are not intended to limit the generally broad scope of the present invention in strict accordance therewith.

*Example I*

A mixture of 54 g. (0.2 mole) of hexachlorocyclopentadiene and 30 g. (0.2 mole) of trichloroacetaldehyde (chloral) was placed in a glass liner of a rotating autoclave having a capacity of 850 cc. The glass liner was sealed in the autoclave and nitrogen pressed in until an initial pressure of 30 atmospheres had been reached. The autoclave was then heated to a temperature of about 250° C. and maintained thereat for a period of about 6 hours. During this time the pressure in the autoclave rose to 60 atmospheres. At the end of this reaction time the autoclave and contents thereof were cooled to room temperature, the final pressure at room temperature being 30 atmospheres. The excess pressure was vented and the reaction product comprising 70 g. of a dark opaque viscous liquid inside the liner was recovered, said material crystallizing upon being decanted. The reaction product was subjected to filtration, the crystals (comprising the desired product) being removed thereby and the filtrate was subjected to fractional distillation in order to obtain more of the same crystalline matter. A total of seven grams of the desired reaction product having the empirical formula $C_6Cl_8$ was recovered.

*Example II*

A mixture of 54 g. (0.2 mole) of hexachlorocyclopentadiene and 30 g. (0.2 mole) of chloral were placed in the glass liner of a rotating autoclave. The liner was sealed into the autoclave and nitrogen pressed in until an initial pressure of 30 atmospheres had been reached. The autoclave was then heated to a temperature of about 211° C., the pressure rising to a maximum of 79 atmospheres. At the end of 5.5 hours the autoclave and contents thereof were cooled to room temperature, the excess pressure was vented and the reaction product consisting of 65 g. of a dark amber liquid and a large amount of a crystalline amber mass was removed from the autoclave. The reaction product was filtered to remove the crystals and the filtrate was subjected to fractional distillation under reduced pressure in order to obtain more of the same crystalline matter. An additional 11 g. of viscous liquid containing some of this crystalline material was separated from the vacuum distillation of the filtrate. A total of 17 grams of the desired product comprising an octachloro substituted cyclic compound containing the empirical formula $C_6Cl_8$ was separated and recovered. This product was subjected to analysis with the following results. Calc. for $C_6Cl_8$: C, 20.26; Cl, 79.74. Found: C, 20.18; Cl, 79.65.

Example III

To illustrate the necessity of having both hexachlorocyclopentadiene and chloral present to obtain the desired $C_6Cl_8$ compound another experiment was performed in which chloral (trichloroacetaldehyde) alone was subjected to a thermal treatment. In this experiment 30 g. (0.2 mole) of chloral was placed in a glass liner of a rotating autoclave. The liner was sealed in the autoclave and nitrogen pressed in until an initial pressure of 30 atmospheres had been reached. The autoclave was heated to a temperature of about 300° C. and maintained thereat for a period of about 5.5 hours during which time the maximum pressure rose to 65 atmospheres. At the end of this time the autoclave and contents thereof were cooled to room temperature, the excess pressure vented and the liner opened to determine if any reaction had taken place. It was discovered that no reaction occurred but there was a substantial loss of the chloral which is presumed to have occurred due to the decomposition thereof.

Hexachlorocyclopentadiene was not heated by itself inasmuch as it is known from prior art that heating said compound to a temperature in the range of from about 225° to about 300° C. produces a compound having the empirical formula $C_{10}Cl_8$ while at temperatures of about 220° C. the dimer $C_{10}Cl_{12}$ is produced.

Example IV

A mixture of 28 g. (0.1 mole) of tribromoacetaldehyde and 57 g. (0.1 mole) of hexabromocyclopentadiene is placed in the glass liner of a rotating autoclave which is thereafter sealed into said autoclave and nitrogen pressed in until an initial pressure of 30 atmospheres is reached. The autoclave and contents thereof is then heated to a temperature of about 250° C. and maintained thereat for a period of about 5 hours during which time the maximum pressure will rise to about 80 atmospheres. At the end of this time the autoclave and contents thereof is cooled to room temperature, the excess pressure is vented and the reaction product is recovered from the liner, said product is filtered to separate the crystalline material from the filtrate, the latter then being subjected to fractional distillation under reduced pressure to recover additional product. The desired reaction product comprising a compound having the empirical formula $C_6Br_8$ is separated and recovered.

Example V

A mixture of 20 g. (0.2 mole) of trifluoroacetaldehyde and 35 g. (0.2 mole) of hexafluorocyclopentadiene is placed in the glass liner of a rotating autoclave which is thereafter sealed into said autoclave and nitrogen pressed in until an initial pressure of 30 atmospheres is reached. The autoclave and contents thereof is then heated to a temperature of about 250° C. and maintained thereat for a period of about 5 hours during which time the maximum pressure will rise to about 80 atmospheres. At the end of this time the autoclave and contents thereof is cooled to room temperature, the excess pressure is vented and the reaction product is recovered from the liner, said product is filtered to separate the crystalline material from the filtrate, the latter then being subjected to fractional distillation under reduced pressure, thereby recovering an additional amount of desired product. The desired reaction product comprising a compound having the empirical formula $C_6F_8$ is separated and recovered.

I claim as my invention:

1. A process which comprises reacting a polyhalocycloalkadiene with a polyhalo substituted acetaldehyde at a temperature in the range of from about 200° to about 260° C., and recovering the resultant polyhalo substituted cyclic reaction product.

2. A process which comprises reacting a polyhalocycloalkadiene with a polyhalo substituted acetaldehyde at a temperature in the range of from about 200° to about 260° C. and at a pressure in the range of from about 25 to about 100 atmospheres, and recovering the resultant polyhalo substituted cyclic reaction product.

3. A process which comprises reacting a polychlorocycloalkadiene with a polychloro substituted acetaldehyde at a temperature in the range of from about 200° to about 260° C. and at a pressure in the range of from about 25 to about 100 atmospheres, and recovering the resultant polychloro substituted cyclic reaction product.

4. A process which comprises reacting a polybromocycloalkadiene with a polybromo substituted acetaldehyde at a temperature in the range of from about 200° to about 260° C. and at a pressure in the range of from about 25 to about 100 atmospheres, and recovering the resultant polybromo substituted cyclic reaction product.

5. A process which comprises reacting a polyfluorocycloalkadiene with a polyfluoro substituted acetaldehyde at a temperature in the range of from about 200° to about 260° C. and at a pressure in the range of from about 25 to about 100 atmospheres, and recovering the resultant polyfluoro substituted cyclic reaction product.

6. A process which comprises reacting hexachlorocyclopentadiene with trichloroacetaldehyde at a temperature in the range of from about 200° to about 260° C. and at a pressure in the range of from about 25 to about 100 atmospheres, and recovering the resultant polychloro substituted cyclic reaction product having the empirical formula $C_6Cl_8$.

7. A process which comprises reacting hexabromocyclopentadiene with tribromoacetaldehyde at a temperature in the range of from about 200° to about 260° C. and at a pressure in the range of from about 25 to about 100 atmospheres, and recovering the resultant polybromo substituted cyclic reaction product having the empirical formula $C_6Br_8$.

8. A process which comprises reacting hexafluorocyclopentadiene with trifluoroacetaldehyde at a temperature in the range of from about 200 to about 260° C. and at a pressure in the range of from about 25 to about 100 atmospheres, and recovering the resultant polyfluoro substituted cyclic reaction product having the empirical formula $C_6F_8$.

References Cited in the file of this patent

Prins: "Rec. des Trav. Chim. des Pays-Bas," vol. 65, pp. 455–467 (1946).

Huntress: "Organic Chlorine Compounds," p. 626 (1948).